(12) United States Patent
Fujisawa et al.

(10) Patent No.: US 10,197,138 B2
(45) Date of Patent: Feb. 5, 2019

(54) DRIVE APPARATUS

(71) Applicant: MINEBEA MITSUMI INC., Nagano (JP)

(72) Inventors: Shinichi Fujisawa, Akiruno (JP); Hidenori Fuma, Tokorozawa (JP)

(73) Assignee: MINEBEA MITSUMI INC., Kitasaku-gun (JP)

( * ) Notice: Subject to any disclaimer, the term of this patent is extended or adjusted under 35 U.S.C. 154(b) by 0 days.

(21) Appl. No.: 15/451,917

(22) Filed: Mar. 7, 2017

(65) Prior Publication Data

US 2017/0261080 A1 Sep. 14, 2017

(30) Foreign Application Priority Data

Mar. 11, 2016 (JP) .................... 2016-048094

(51) Int. Cl.

| F16H 25/20 | (2006.01) |
|---|---|
| F16M 11/10 | (2006.01) |
| F16M 11/18 | (2006.01) |
| F16M 11/20 | (2006.01) |
| F16M 11/22 | (2006.01) |

(Continued)

(52) U.S. Cl.
CPC ......... *F16H 25/2015* (2013.01); *F16H 35/18* (2013.01); *F16M 11/10* (2013.01); *F16M 11/18* (2013.01); *F16M 11/2014* (2013.01); *F16M 11/22* (2013.01); *F21V 21/15* (2013.01); *F16H 2025/209* (2013.01); *F16H 2025/2043* (2013.01); *F16H 2025/2084* (2013.01)

(58) Field of Classification Search
CPC .... F16H 25/2015; F16M 11/10; F16M 11/18; F16M 11/2014; F16M 11/22; F21V 21/15; B64D 47/04; F21S 2/00; F21W 107/30
See application file for complete search history.

(56) References Cited

U.S. PATENT DOCUMENTS

| 1,386,025 A | * | 8/1921 | Pittman .................. F16M 11/10 |
|---|---|---|---|
| | | | 248/183.4 |
| 7,531,972 B1 | | 5/2009 | Worsham et al. |

(Continued)

FOREIGN PATENT DOCUMENTS

| JP | S62-81904 U | 5/1987 |
|---|---|---|
| JP | 2011-003346 A | 1/2011 |

(Continued)

OTHER PUBLICATIONS

Feb. 6, 2018 Office Action issued in Japanese Patent Application No. 2016-048094.

*Primary Examiner* — Zakaria Elahmadi
(74) *Attorney, Agent, or Firm* — Oliff PLC (57) ABSTRACT

A drive apparatus according to an embodiment includes a first rotation unit, a base, a lead screw unit, and a second rotation unit. The first rotation unit includes a gear rotatable in first directions by a drive power source. The base is joined to the gear and is rotatable in the first directions with the gear. The lead screw unit is provided to the base and moves a shaft back and forth in a certain direction. The second rotation unit is pivotally supported by the base, rotates in second directions different from the first directions, and supports a certain supported member rotatably in the second directions.

7 Claims, 10 Drawing Sheets

(51) Int. Cl.
*F21V 21/15* (2006.01)
*F16H 35/18* (2006.01)

(56) References Cited

U.S. PATENT DOCUMENTS

| | | | |
|---|---|---|---|
| 2013/0206957 A1* | 8/2013 | Kalman | F16D 3/18 248/660 |
| 2015/0252940 A1* | 9/2015 | Goodwin | A61G 5/10 403/113 |
| 2016/0268669 A1* | 9/2016 | Wilcox | H01Q 1/125 |
| 2017/0074488 A1* | 3/2017 | Fujisawa | F21S 8/04 |
| 2017/0123297 A1* | 5/2017 | Speggiorin | G03B 17/561 |

FOREIGN PATENT DOCUMENTS

| | | | |
|---|---|---|---|
| JP | 2011-246028 A | | 12/2011 |
| JP | 2011246028 A | * | 12/2011 |

* cited by examiner

DRIVE APPARATUS

CROSS-REFERENCE TO RELATED APPLICATION(S)

The present application claims priority to and incorporates by reference the entire contents of Japanese Patent Application No. 2016-048094 filed in Japan on Mar. 11, 2016.

BACKGROUND OF THE INVENTION

1. Field of the Invention

The present invention relates to a drive apparatus.

2. Description of the Related Art

Techniques for rotatably supporting a certain supported member are known. For example, techniques for rotatably supporting a lighting member, as a supported member, including a certain light source are known. For example, a technique for rotating a lighting member to a desired angle in two types of rotational directions is known, one type of which is rotational directions in a vertical plane and the other type of which is rotational directions of the vertical plane itself (see Japanese Patent Application Laid-open No. 2011-003346, for example).

Such a conventional technique uses, for example, a planetary gear mechanism to rotate the certain supported member. However, this mechanism is complicated, and thus, it is difficult to achieve a simple configuration for rotatably supporting the supported member in two types of rotational directions.

SUMMARY OF THE INVENTION

It is an object of the present invention to at least partially solve the problems in the conventional technology.

A drive apparatus according to an embodiment includes a first rotation unit, a base, a lead screw unit and a second rotation unit. The first rotation unit includes a gear rotated in first directions by a drive power source. The base is joined to the gear and rotates in the first directions with the gear. The lead screw unit is provided to the base and moves a shaft back and forth in a certain direction. The second rotation unit is pivotally supported by the base, rotates in second directions that differ from the first directions in accordance with back-and-forth movement of the shaft, and supports a certain supported member rotatably in the second directions.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENT

The following describes a drive apparatus according to an embodiment of the present invention with reference to the accompanying drawings. This drive apparatus 1 according to the embodiment is, for example, a floodlight projector that rotatably supports a lighting member 60, as a supported member, including certain light sources 61. The applications of the drive apparatus 1 are not limited by the embodiment described below. The drive apparatus 1 may rotatably support any type of supported member other than the lighting member 60 for the intended use. It should be noted that the accompanying drawings are schematic, and the dimensional relation between components and proportions of the components may differ from the actual ones. The dimensional relations and proportions of the components may differ in each drawing.

Embodiment

Figure 1:
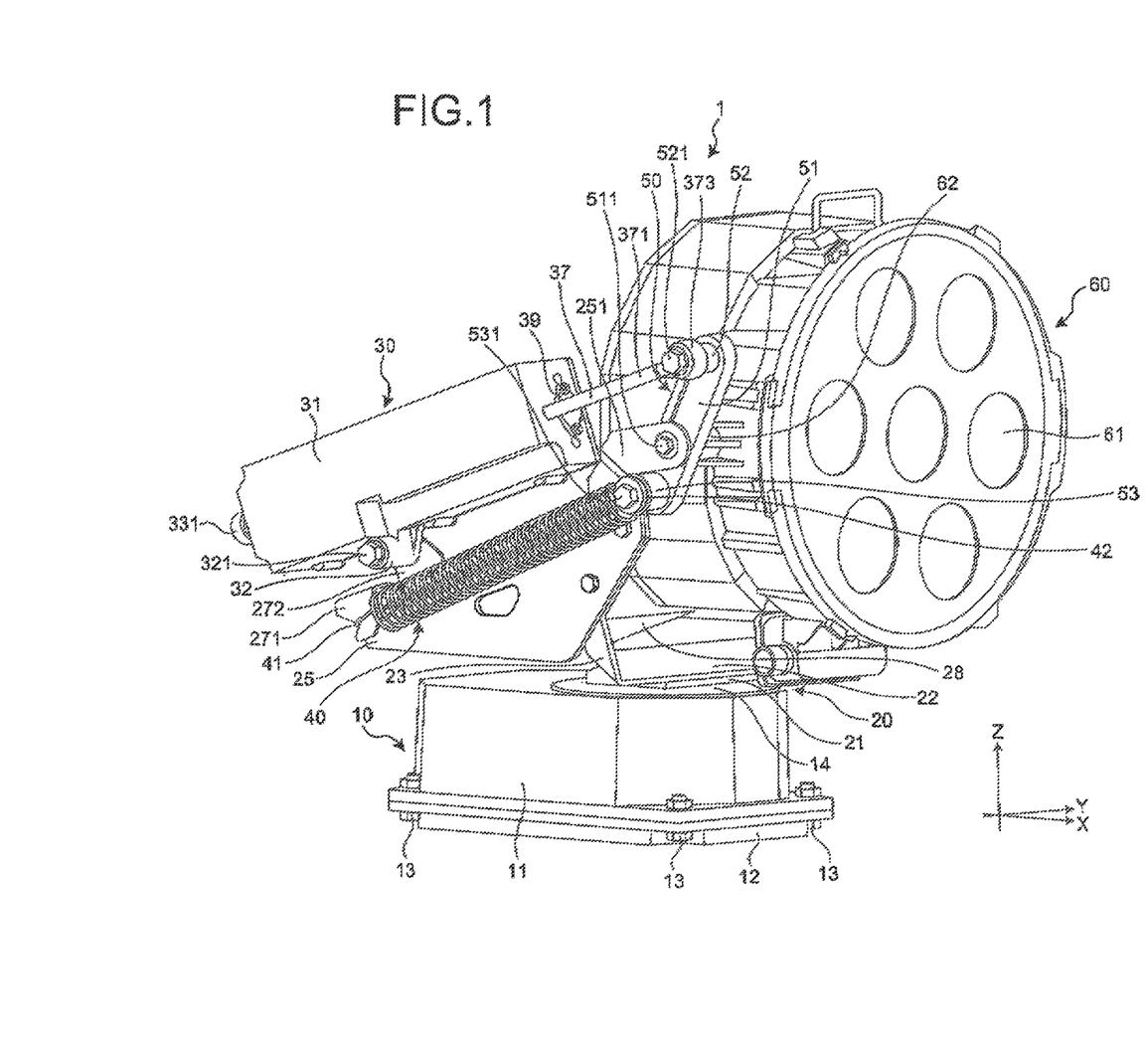
FIG. 1 is a perspective view illustrating a drive apparatus according to an embodiment of the present invention.
Figure 2:
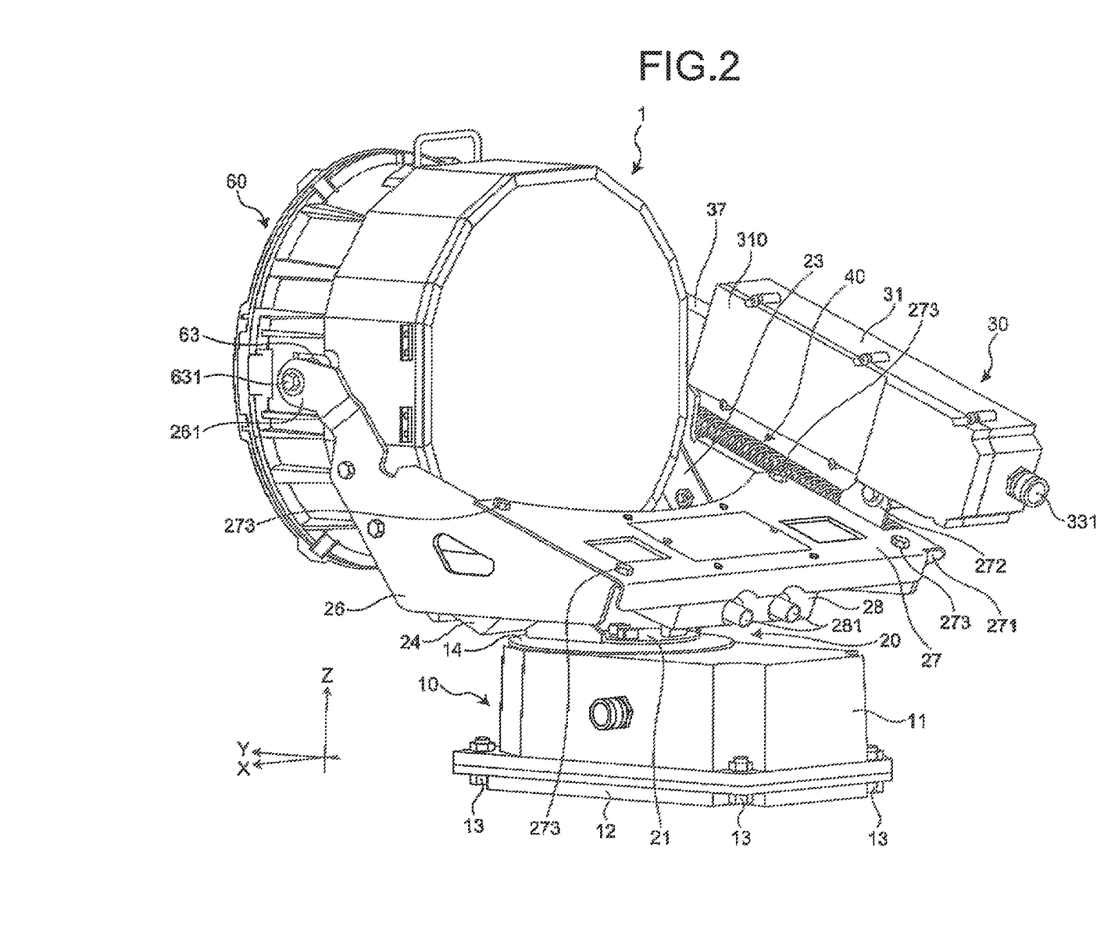
FIG. 2 is another perspective view illustrating the drive apparatus according to the embodiment.

First, a general configuration of the drive apparatus 1 is described with reference to FIGS. 1 and 2. FIGS. 1 and 2 are perspective views illustrating the drive apparatus according to the embodiment. Specifically, FIG. 1 is a perspective view illustrating the drive apparatus 1 seen from the light sources 61 of the lighting member 60. FIG. 2 is a perspective view illustrating the drive apparatus 1 seen from a side opposite to the light sources 61 of the lighting member 60 relative to the viewpoint in FIG. 1.

Figure 8:
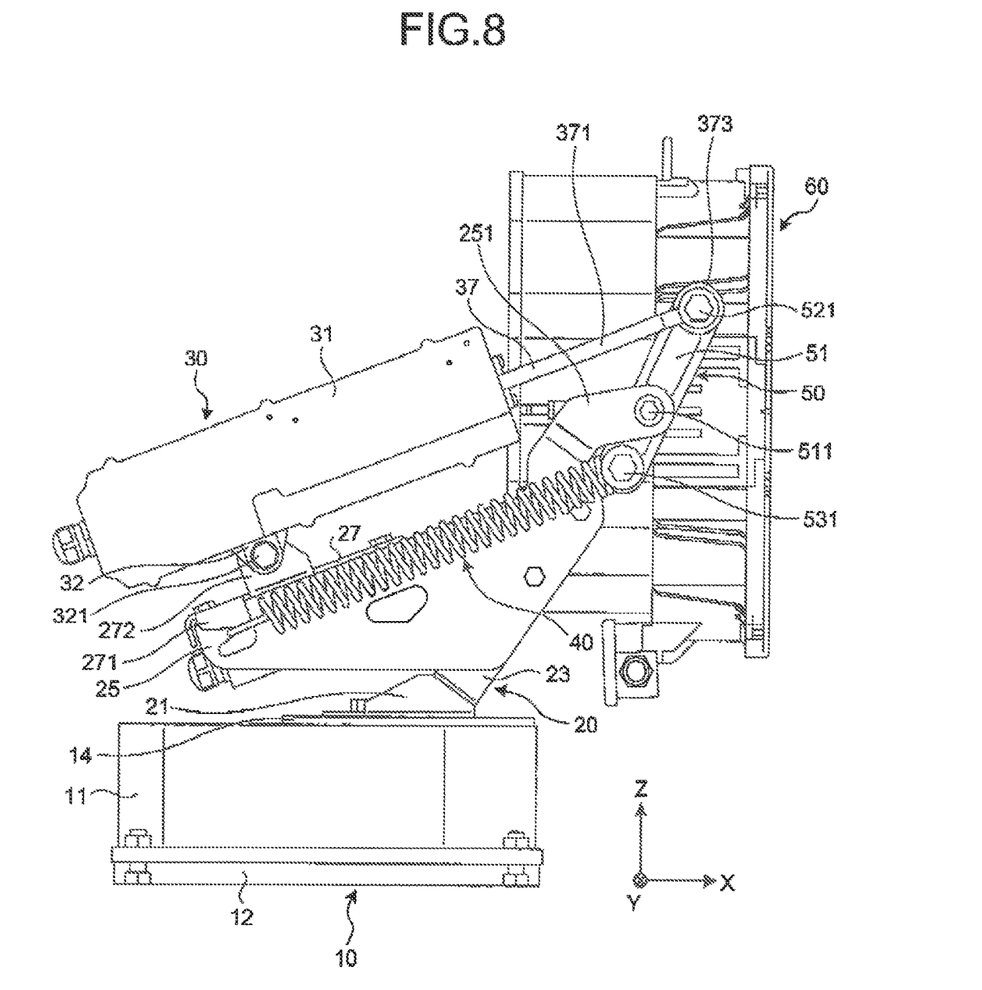
FIG. 8 is a side view illustrating the drive apparatus according to the embodiment.

The drive apparatus 1 according to the present embodiment includes a first rotation unit 10, a base 20, a lead screw unit 30, an elastic member 40, a link 50, and the lighting member 60. For example, the drive apparatus 1 illustrated in FIG. 1 is used such that the first rotation unit 10 is placed on a certain resting surface such as a floor or a ground. In the following description, the surface on which the first rotation unit 10 is placed is a horizontal surface, and the direction perpendicular to the horizontal surface may be referred to as vertical directions. In FIG. 8, for example, the horizontal surface corresponds to an XY plane.

The first rotation unit 10 includes a spur gear 100 rotated by the drive of a motor 120 (see FIG. 3) in first directions. The first directions are directions about the axis of the spur gear 100 and are in-plane directions on the horizontal plane (XY plane), and may be hereinafter referred to as horizontal directions. In FIG. 8, for example, the axis of the spur gear 100 extends in a Z-axis direction.

The first rotation unit 10 has a housing 11 and a bottom wall 12. The housing 11 has a box shape with an open surface on one surface thereof (bottom surface in FIG. 8). The bottom wall 12 has a plate-like shape and is mounted to the housing 11 by fastening members 13 to cover the open surface of the housing 11. The fastening members 13 may be, for example, a screw mechanism of a bolt and a nut. The housing 11 and the bottom wall 12 may be made of, for example, metal such as aluminum or resin. The housing 11 and the bottom wall 12 may be made of any material as long as the material satisfies a certain condition such as rigidity.

Figure 3:
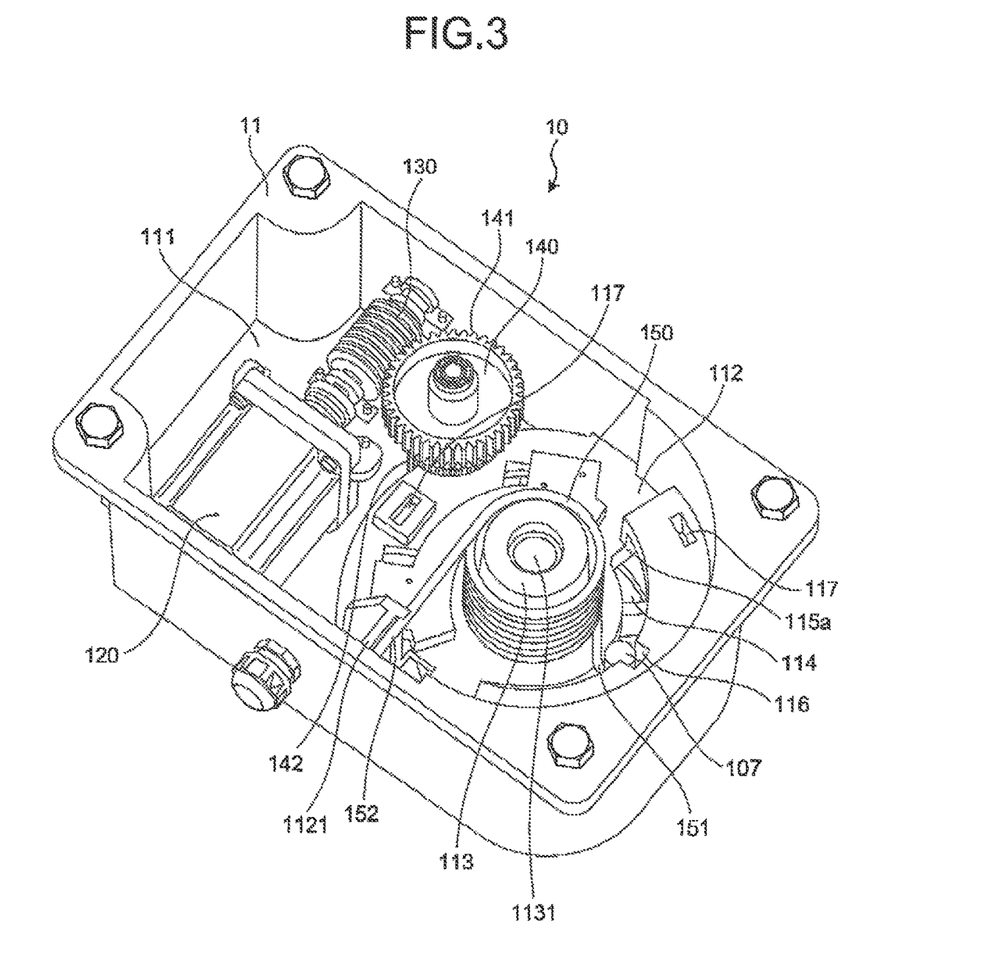
FIG. 3 is a perspective view illustrating a first rotation unit according to the embodiment.
Figure 4:
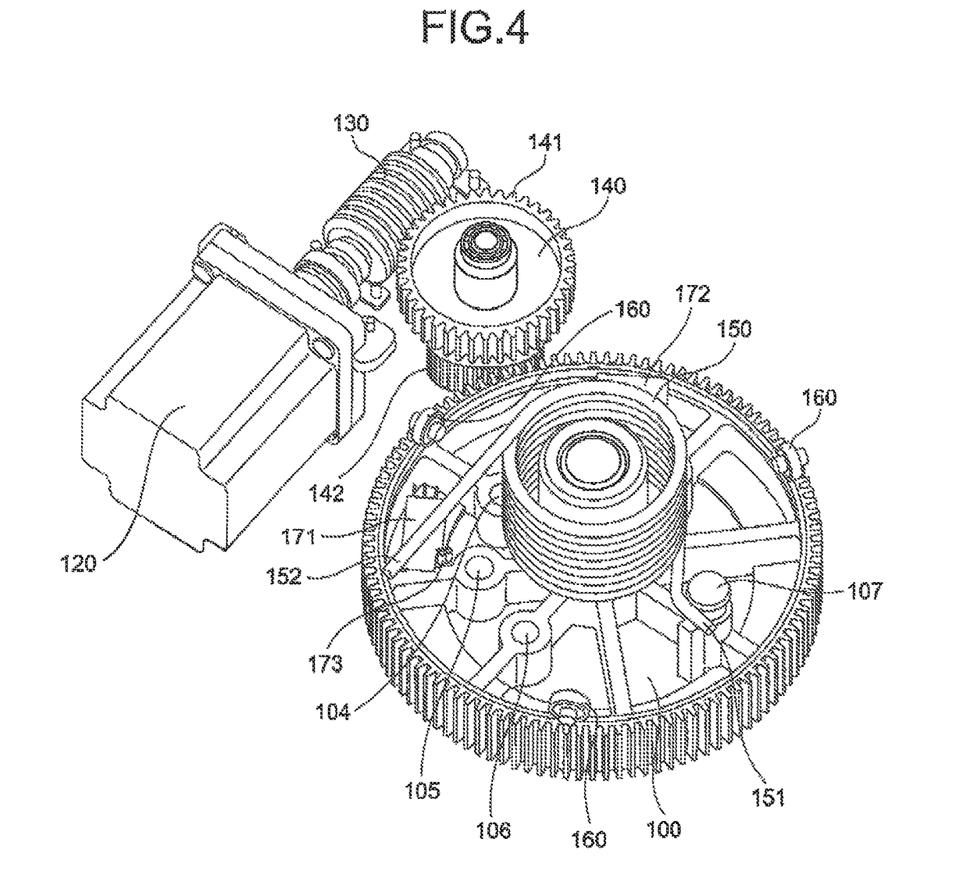
FIG. 4 is a perspective view illustrating main components of the first rotation unit according to the embodiment.
Figure 5:
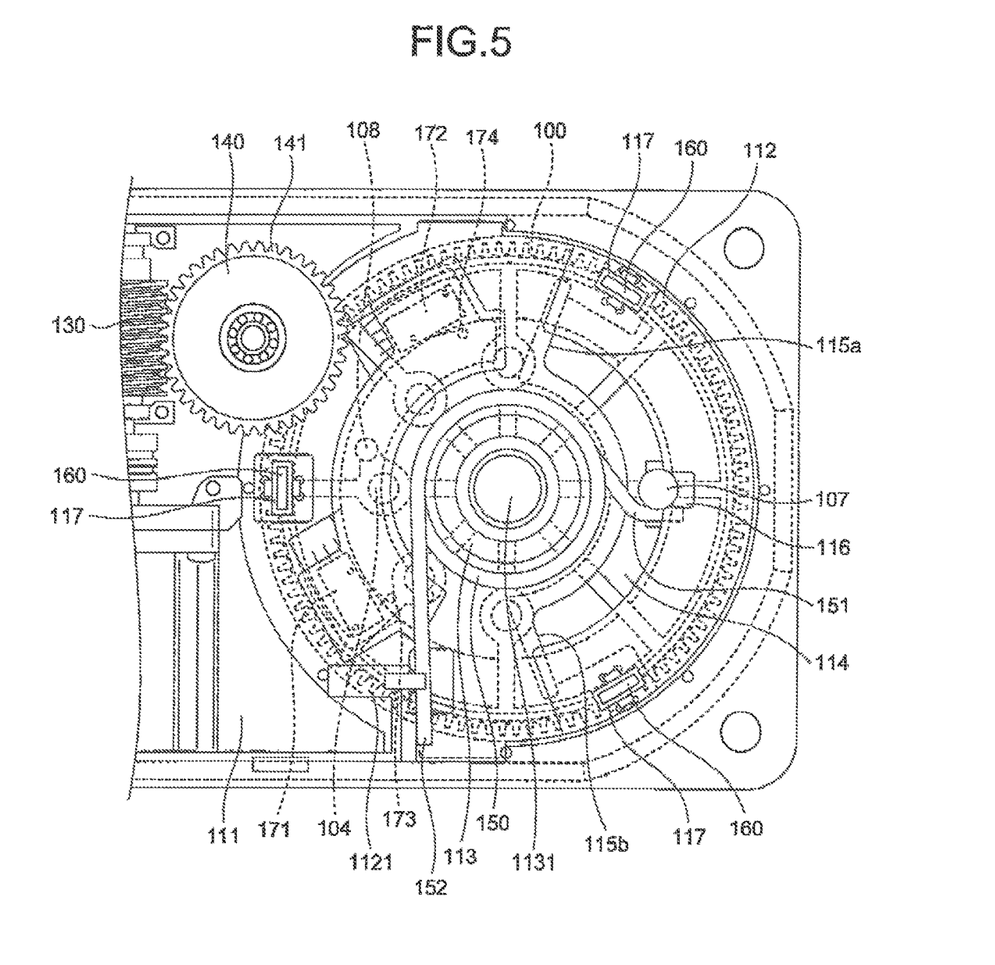
FIG. 5 is a plan view (transparent view) illustrating the first rotation unit according to the embodiment.

Configurations of the first rotation unit 10 are described with reference to FIGS. 3 to 5. FIG. 3 is a perspective view illustrating the first rotation unit 10 according to the embodiment. Specifically, FIG. 3 is a perspective view illustrating the inside of the housing 11 with the bottom wall 12 of the first rotation unit 10 being removed. FIG. 4 is a perspective view illustrating main components of the first rotation unit 10 according to the embodiment. Specifically, FIG. 4 is a perspective view illustrating drive components of the first rotation unit 10 with the housing 11 and the bottom wall 12 of the first rotation unit 10 being removed. FIG. 5 is a plan view (transparent view) illustrating the first rotation unit 10 according to the embodiment. Specifically, FIG. 5 is a transparent plan view illustrating the inside of the housing 11 seen from the open surface with the bottom wall 12 of the first rotation unit 10 being removed.

As illustrated in FIG. 3, the housing 11 has a storage portion 111 formed inward from the open surface, and a recessed portion 112 recessed from the surface opposite to the open surface (that is, from the upper surface in FIG. 8) toward the open surface. In the storage portion 111 of the housing 11, the motor 120, a worm 130, and a two-speed gear 140 are stored.

The motor 120 is configured by, for example, a stepper motor, and functions as a drive power source for rotating the lighting member 60 in the first directions. Drive signals for driving the motor 120 may be provided in a wired or wireless manner. When, for example, the drive signals are provided to the motor 120 in a wired manner, the drive signals are provided to the motor 120 via a lead wire (not illustrated). In this case, the drive signals may be provided to the motor 120 from, for example, a controller installed in a storage box 28 to be described later via the lead wire.

When, for example, the drive signals are provided to the motor 120 in a wireless manner, the drive signals are provided to the motor 120 by, for example, a receiver (not illustrated). In this case, the drive signals may be provided to the motor 120 from, for example, a wireless module installed in the storage box 28 to be described later. The drive signals provided to the motor 120 cause an output rotation shaft of the motor 120 to rotate. The type of the motor is not limited to the stepper motor, and may be any type of motor such as a direct current (DC) motor or a brushless DC motor.

The worm 130 is attached to the leading end of the output rotation shaft of the motor 120. The worm 130 is, for example, a worm of a worm gear arrangement. The worm 130 is a gear in the form of a cylindrical screw. The worm 130 may be made of, for example, metal or resin. The worm 130 may be made of any material as long as the material satisfies a certain condition such as rigidity.

The two-speed gear 140 includes a first gear 141 and a second gear 142 having a smaller diameter than the first gear 141. As illustrated in FIG. 3, the first gear 141 of the two-speed gear 140 meshes with the worm 130. For example, the first gear 141 has the teeth formed on its outer surface to mesh with the worm 130. In other words, the first gear 141 of the two-speed gear 140 functions as a worm wheel that meshes with the worm 130, and the combination of the worm 130 and the first gear 141 configures the worm gear arrangement. As illustrated in FIG. 4, the second gear 142 of the two-speed gear 140 meshes with the spur gear 100 disposed in the recessed portion 112 to be described later. With this arrangement, the rotation of the motor 120 is transferred to the spur gear 100. The self-locking function of the worm gear arrangement restricts the spur gear 100 from rotating in a direction of the first directions. When the motor 120 is stopped, certain power such as detent torque can restrict the spur gear 100 from rotating in a direction of the first directions depending on the type and performance of the motor 120. In the example illustrated in FIG. 5, the rotation of the spur gear 100 is restricted to counterclockwise rotation when the motor 120 is stopped.

As illustrated in FIG. 3, the recessed portion 112 is recessed in the thickness of the housing 11 from the surface opposite to the open surface of the housing 11. For example, the recessed portion 112 is formed in a region other than the region of the storage portion 111 storing the motor 120, the worm 130, and the two-speed gear 140 therein. The recessed portion 112 has a shape that conforms to the shape of the spur gear 100 so that the spur gear 100 can be stored therein. In the example illustrated in FIG. 5, the recessed portion 112 has a circular shape in the plan view. The recessed portion 112 communicates with the storage portion 111 at a communicating portion at which the spur gear 100 meshes with the second gear 142 of the two-speed gear 140.

Figure 6:
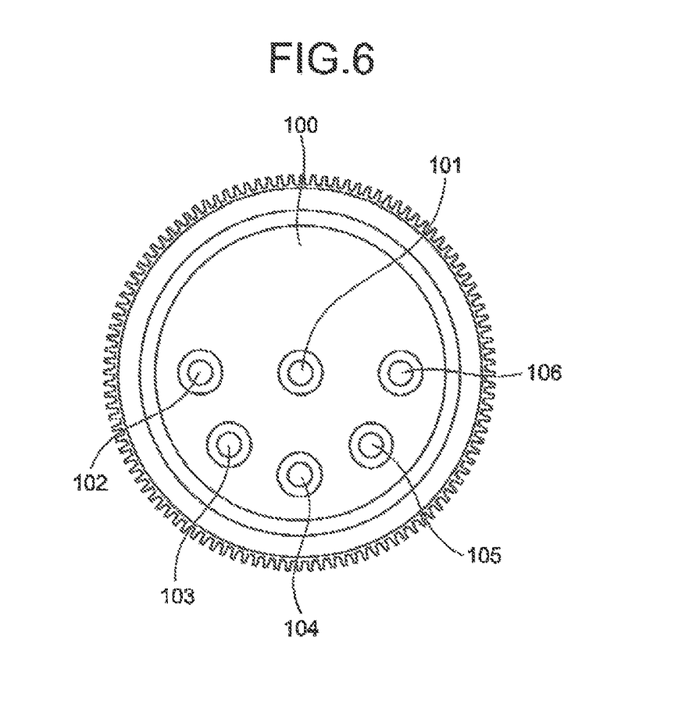
FIG. 6 is a plan view illustrating a spur gear according to the embodiment.

The spur gear 100 has a planar disc shape. The spur gear 100 may be made of, for example, metal or resin. The spur gear 100 may be made of any material as long as the material satisfies a certain condition such as rigidity. A center hole 101 (see FIG. 6) is provided in a center portion on a surface (or an "upper surface" in the following description) of the spur gear 100.

A plurality of peripheral holes 102 to 106 are provided in a peripheral portion on the upper surface of the spur gear 100 along the circumferential direction. In the example illustrated in FIG. 6, five peripheral holes 102 to 106 are formed in the peripheral portion of the upper surface of the spur gear 100 at certain intervals in the circumferential direction. Specifically, the peripheral hole 102 and the peripheral hole 106 are disposed opposite to each other across the center hole 101, and the peripheral holes 103 to 105 are disposed between the peripheral holes 102 and 106 at certain intervals in the circumferential direction. The spur gear 100 is joined to the base 20 through the peripheral holes 102 to 106 that are a plurality of joining mechanisms provided on a part of the planar peripheral portion of the spur gear 100. The spur gear 100 is joined to the base 20 such that the orientation of the base 20 can be changed in the first directions. How the base 20 is joined to the spur gear 100 through the center hole 101 and the peripheral holes 102 to 106 will be described later.

A first protrusion 107 is provided on a surface (or a "lower surface" in the following description) of the spur gear 100. The lower surface is a surface close to the bottom wall 12. The first protrusion 107 protrudes in the direction of the thickness of the spur gear 100. For example, the first protrusion 107 is disposed in a position opposite to the position of the center hole 101 and the peripheral holes 102 to 106 about the axis of the spur gear 100. For example, the first protrusion 107 may be a separated member such as a pin inserted in an insert hole provided on the lower surface of the spur gear 100, or may be integrally formed with the spur gear 100. A second protrusion 108 is provided on the lower surface of the spur gear 100 close to a position of the peripheral hole 104. The second protrusion 108 protrudes in the direction of the thickness of the spur gear 100.

The spur gear 100 is disposed inside the recessed portion 112 with the upper surface facing the opening of the recessed portion 112. The recessed portion 112 is covered with a cover 14 such that a part of the spur gear 100 is exposed to the outside. For example, the cover 14 has an annular shape having a hole in its center portion. The cover 14 is mounted to the recessed portion 112 such that the upper surface of the spur gear 100 on which the center hole 101 and the peripheral holes 102 to 106 are provided is exposed to the outside from the center portion of the cover 14 (refer to FIG. 7). The spur gear 100 is stored in the recessed portion 112 in this manner.

An extending portion 113 is provided in a protruding manner from a center portion of the bottom surface of the recessed portion 112 in the direction of the thickness of the housing 11. The extending portion 113 has a cylindrical shape extending in the direction of the thickness of the housing 11. The spur gear 100 is rotatably supported by a column-like supporting member 1131 disposed inside the extending portion 113. For example, the supporting member 1131 disposed inside the extending portion 113 is inserted into a shaft hole provided on the lower side of the center hole 101 that is disposed on the upper surface of the spur gear 100. The shaft hole has a larger diameter than that of the center hole 101. Thus, the spur gear 100 is rotatably supported in the recessed portion 112.

A cut-off portion 114 is provided on the bottom surface of the recessed portion 112 and is formed by cutting off a portion of the bottom surface for a certain length along the circumferential direction. The recessed portion 112 also communicates with the storage portion 111 through the cut-off portion 114. The cut-off portion 114 has a first end wall 115*a* and a second end wall 115*b* formed at a first end and a second end, respectively, thereof in the circumferential direction of the bottom surface of the recessed portion 112.

The spur gear 100 is placed inside the recessed portion 112 with the first protrusion 107 of the spur gear 100 being positioned in the cut-off portion 114. In the example illustrated in FIG. 3, the first protrusion 107 of the spur gear 100 projects from the cut-off portion 114 to the storage portion 111. This configuration allows the first protrusion 107 of the spur gear 100 to move between the first end wall 115*a* and the second end wall 115*b* in the circumferential direction of the bottom surface of the recessed portion 112. More details will be described later.

A coiled spring member 150 is provided in the storage portion 111. The spring member 150 is, for example, a torsion spring. In the storage portion 111, the spring member 150 is placed near the center portion of the bottom surface of the recessed portion 112 with the extending portion 113 of the recessed portion 112 inserted therein. As illustrated in FIG. 5, a first end 151 of the spring member 150 is secured by the first protrusion 107 of the spur gear 100, and a second end 152 is secured by a locking wall 1121 projecting from the bottom surface of the recessed portion 112. For example, the first end 151 of the spring member 150 is inserted into a cut-off portion 116 provided on the bottom surface of the recessed portion 112 and is secured by the first protrusion 107.

Thus, the spring member 150 rotationally biases the spur gear 100. For example, the spring member 150 rotationally biases the spur gear 100 in another direction of the first directions opposite to the direction in which the spur gear 100 is restricted from rotating when the motor 120 is stopped. In the example illustrated in FIG. 5, the spur gear 100 is biased counterclockwise by the spring member 150. With the biasing spring member 150, the drive apparatus 1 can prevent the lighting member 60 from rotating in the first directions irrespective of the drive of the motor 120. Thus, the drive apparatus 1 can prevent the spur gear 100 from rotating under wind pressure to the lighting member 60, for example. When, for example, the rotational position of the spur gear 100 is temporarily changed under wind pressure, the drive apparatus 1 can put the spur gear 100 back into its original position by the biasing power of the spring member 150.

A plurality of through holes 117 are provided at peripheral portions on the bottom surface of the recessed portion 112 at certain intervals in the circumferential direction. In the example illustrated in FIG. 5, three through holes 117 are provided at the peripheral portions on the bottom surface of the recessed portion 112 at equal intervals (at 120 degrees). Each through hole 117 rotatably supports a bearing 160. The bearing 160 is disposed such that its peripheral surface abuts the back surface of the spur gear 100. The bearings 160 function as bearings that support the spur gear 100 in the axial direction of the gear in the first rotation unit 10. The bearings 160 provided in the through holes 117 receive the load on the spur gear 100, and the spur gear 100 is easily rotated. This configuration can reduce the losses in the rotation of the spur gear 100. The number of the through holes 117 and the bearings 160 is not limited to three, but may be, for example, five or any other numbers.

In the recessed portion 112, a pair of mechanical switches 171 and 172 are disposed at a certain interval in the circumferential direction of the bottom surface of the recessed portion 112. In the example illustrated in FIG. 5, the mechanical switch 171 has a switch portion 173 extending toward the center of the bottom surface of the recessed portion 112, and the mechanical switch 172 has a switch portion 174 extending toward the center of the bottom surface of the recessed portion 112.

The switch portion 173 of the mechanical switch 171 and the switch portion 174 of the mechanical switch 172 are gradually pushed outwardly of the bottom surface of the recessed portion 112 by the second protrusion 108 protruding from the lower surface of the spur gear 100 as the second protrusion 108 approaches the switch portions in accordance with the rotation of the spur gear 100. The mechanical switch 171 or the mechanical switch 172 is turned on when the second protrusion 108 of the spur gear 100 reaches a certain position. For example, when the mechanical switch 171 is turned on, the mechanical switch 171 transmits an electric signal to a certain mechanism such as a controller, and the rotation of the motor 120 is stopped.

In other words, the second protrusion 108 is movable between a position at which the mechanical switch 171 is turned on and a position at which the mechanical switch 172 is turned on. With this configuration, the mechanical switches 171 and 172 function as a detection mechanism that limits the range of rotation of the spur gear 100 to a certain angle (hereinafter also referred to as a "first rotation angle"). Other devices such as sensors may be used instead of the mechanical switches 171 and 172 as long as the range of rotation of the spur gear 100 can be limited to the first rotation angle. When, for example, the first rotation angle is 120 degrees, the spur gear 100 rotates by 120 degrees in the first directions.

As described above, the first protrusion 107 of the spur gear 100 is movable between the first end wall 115*a* and the second end wall 115*b* in the circumferential direction of the bottom surface of the recessed portion 112. The range in which the first protrusion 107 of the spur gear 100 can move is limited to a certain range by physical contact with the first end wall 115a and the second end wall 115b that are configured separately from the spur gear 100. In other words, the first end wall 115a and the second end wall 115b of the recessed portion 112 function as a limiting mechanism for limiting the range of rotation of the spur gear 100 to a certain angle (hereinafter also referred to as a "second rotation angle").

In the example illustrated in FIG. 5, the range between the first end wall 115a and the second end wall 115b is wider than the range between the position at which the mechanical switch 171 is turned on and the position at which the mechanical switch 172 is turned on. In other words, in the example illustrated in FIG. 5, the second rotation angle is larger than the first rotation angle. Even if the mechanical switch 171 or 172 does not work properly, the drive apparatus 1 can prevent the spur gear 100 from rotating far beyond a certain angle by physically limiting the range of rotation by using the first end wall 115a and the second end wall 115b. When, for example, the second rotation angle is 150 degrees, the spur gear 100 is restricted from rotating beyond 150 degrees in the first directions by the first end wall 115a or the second end wall 115b.

Figure 7:
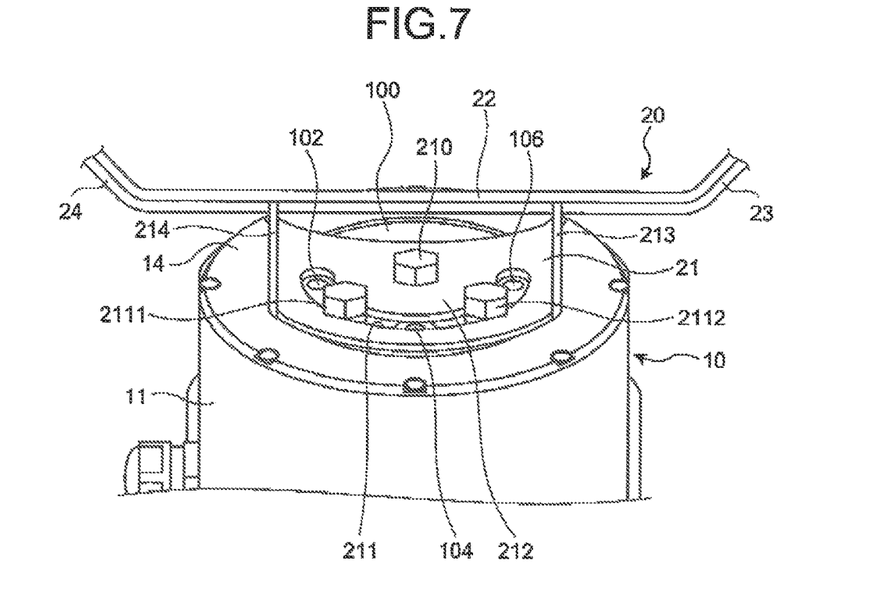
FIG. 7 is a perspective view illustrating a connection between the first rotation unit and a base according to the embodiment.

The base 20 is joined to the spur gear 100, and is rotated with the rotation of the spur gear 100 in the first directions. In other words, in the present embodiment, the base 20 is joined to the spur gear 100 to rotate in horizontal directions (pan directions). Details of the base 20 are described next. FIG. 7 is a perspective view illustrating a connection between main components of the first rotation unit and those of the base according to the embodiment.

The base 20 includes a joining part 21, a supporting part 22, a pair of extending parts 23 and 24, a pair of arms 25 and 26 (see FIG. 1 or 2), and a fixing member 27. The joining part 21 has a flat portion 212 having an arc-like through hole 211, and end portions 213 and 214 extending in the direction of the thickness of the flat portion 212. The joining part 21 is placed on the upper surface of the spur gear 100 with the peripheral holes 102 to 106 of the spur gear 100 being exposed from the through hole 211. In other words, the through hole 211 is formed in the flat portion 212 of the joining part 21 to have a width and a length that can expose the peripheral holes 102 to 106 of the spur gear 100 therefrom.

Another through hole (not illustrated) is provided in the center of the flat portion 212. A fastening member 210 is inserted into the through hole of the flat portion 212 and the center hole 101 of the spur gear 100 for installation. For example, the fastening member 210 has a threaded surface and is screwed into the through hole of the flat portion 212 and into the center hole 101 of the spur gear 100. In the example illustrated in FIG. 7, a fastening member 2111 is inserted into the through hole 211 of the flat portion 212 and into the peripheral hole 103 of the spur gear 100 for installation. For example, the fastening member 2111 has a threaded surface and is screwed into the peripheral hole 103 of the spur gear 100. A head of the fastening member 2111 having a larger diameter than the through hole 211 pushes the flat portion 212 toward the spur gear 100. In the example illustrated in FIG. 7, a fastening member 2112 is inserted into the through hole 211 of the flat portion 212 and into the peripheral hole 105 of the spur gear 100 for installation. For example, the fastening member 2112 has a threaded surface and is screwed into the peripheral hole 105 of the spur gear 100. A head of the fastening member 2112 having a larger diameter than the through hole 211 pushes the flat portion 212 toward the spur gear 100. Thus, the base 20 is rotatably joined to the first rotation unit 10 such that the base 20 can rotate with the spur gear 100.

In the example described above, the base 20 is joined to the spur gear 100 through the center hole 101 and the peripheral holes 103 and 105 of the spur gear 100, but the base 20 may be joined to the spur gear 100 through any of the center hole 101 and the peripheral holes 102 to 106 of the spur gear 100 as long as the base 20 can be joined to the spur gear 100. In other words, the base 20 is joined to the spur gear 100 by using any of the center hole 101 and the peripheral holes 102 to 106 of the spur gear 100 as appropriate, and thus, the base 20 is movably joined to the spur gear 100 in the first directions. For example, when the base 20 is joined to the spur gear 100 such that an end of the through hole 211 in the circumferential direction is placed at the position of the peripheral hole 104 of the spur gear 100, the base 20 is joined to the spur gear 100 with 90 degrees rotated about the axis of the spur gear 100 relative to the mount position illustrated in FIG. 7, that is, with 90 degrees shifted from the orientation of the base 20. As described above, the drive apparatus 1 can change the position (initial position) of the base 20 by using the center hole 101 and the peripheral holes 102 to 106 of the spur gear 100 when the base 20 is mounted to the spur gear 100. With this configuration, the drive apparatus 1 can change the rotational orientation of the base 20 in accordance with the initial position of the base 20 at the time of mounting to the spur gear 100.

The end portions 213 and 214 of the joining part 21 are provided to stand in a distal direction from the spur gear 100 with the base 20 being joined to the spur gear 100. The supporting part 22 having an elongated plate shape is continuously provided to the edges of the end portions 213 and 214. The extending parts 23 and 24 symmetrically extend from the end portions of the supporting part 22 in the longitudinal direction.

The arm 25 (see FIG. 1) is mounted to the extending part 23. For example, the arm 25 is mounted to the extending part 23 by a certain fastening mechanism such as screwing. The arm 26 (see FIG. 2) is mounted to the extending part 24. For example, the arm 26 is mounted to the extending part 24 by a certain fastening mechanism such as screwing. The lighting member 60 is interposed between an end portion 251 of the arm 25 and an end portion 261 of the arm 26, thereby being supported by the arms 25 and 26. Further details will be described later.

The fixing member 27 having a plate-like shape across the arms 25 and 26 is disposed between an end portion of the arm 25 opposite to the end portion 251 thereof and an end portion of the arm 26 opposite to the end portion 261 thereof. At an end of the fixing member 27 close to the arm 25, a bent portion 271 bent in a direction (downward direction, that is, −Z axis direction in FIG. 8) and a pivot support portion 272 extending in the opposite direction (upward direction, that is, +Z axis direction in FIG. 8) are provided. The fixing member 27 is mounted to the arms 25 and 26 by certain fastening members 273. The fastening members 273 may be, for example, a screw mechanism of a bolt and a nut. To the bent portion 271, a first end 41 of the elastic member 40 such as a coil spring is hooked. The pivot support portion 272 pivotally supports the lead screw unit 30. Further details will be described later.

The storage box 28 is provided on a back surface (a surface facing the first rotation unit 10) of the fixing member 27. The storage box 28 may be, for example, a relay box used for relay connection between wires or cables. The wires or cables are introduced to the storage box 28 through insert holes 281, for example. The storage box 28 may store therein any type of devices, such as a wireless module, a power source, or a controller, for the intended use and application.

The lead screw unit 30 is mounted to the base 20, and is configured to move a shaft 37 back and forth in a certain direction. Details of the base 20 will be described herein. FIG. 8 is a side view illustrating the drive apparatus according to the embodiment.

The lead screw unit 30 has a housing 31 having an elongated box shape and a cover 310 (see FIG. 2). The housing 31 has a box shape with one surface (a surface opposite to the illustrated surface of the housing 31 in FIG. 8) being an open surface. The cover 310 has a plate-like shape and is mounted to the housing 31 by a certain fastening mechanism to cover the open surface of the housing 31. The shaft 37 projects from an end of the housing 31 in the longitudinal direction.

A mounting lug 32 is provided on a part (a lower part in FIG. 8) of the housing 31 in a protruding manner. The mounting lug 32 of the housing 31 is mounted to the pivot support portion 272 by a certain fastening member 321. The fastening member 321 may be, for example, a screw mechanism of a bolt and a nut. Thus, the housing 31 is rotatably supported about the mounting lug 32 relative to the base 20.

Figure 9:
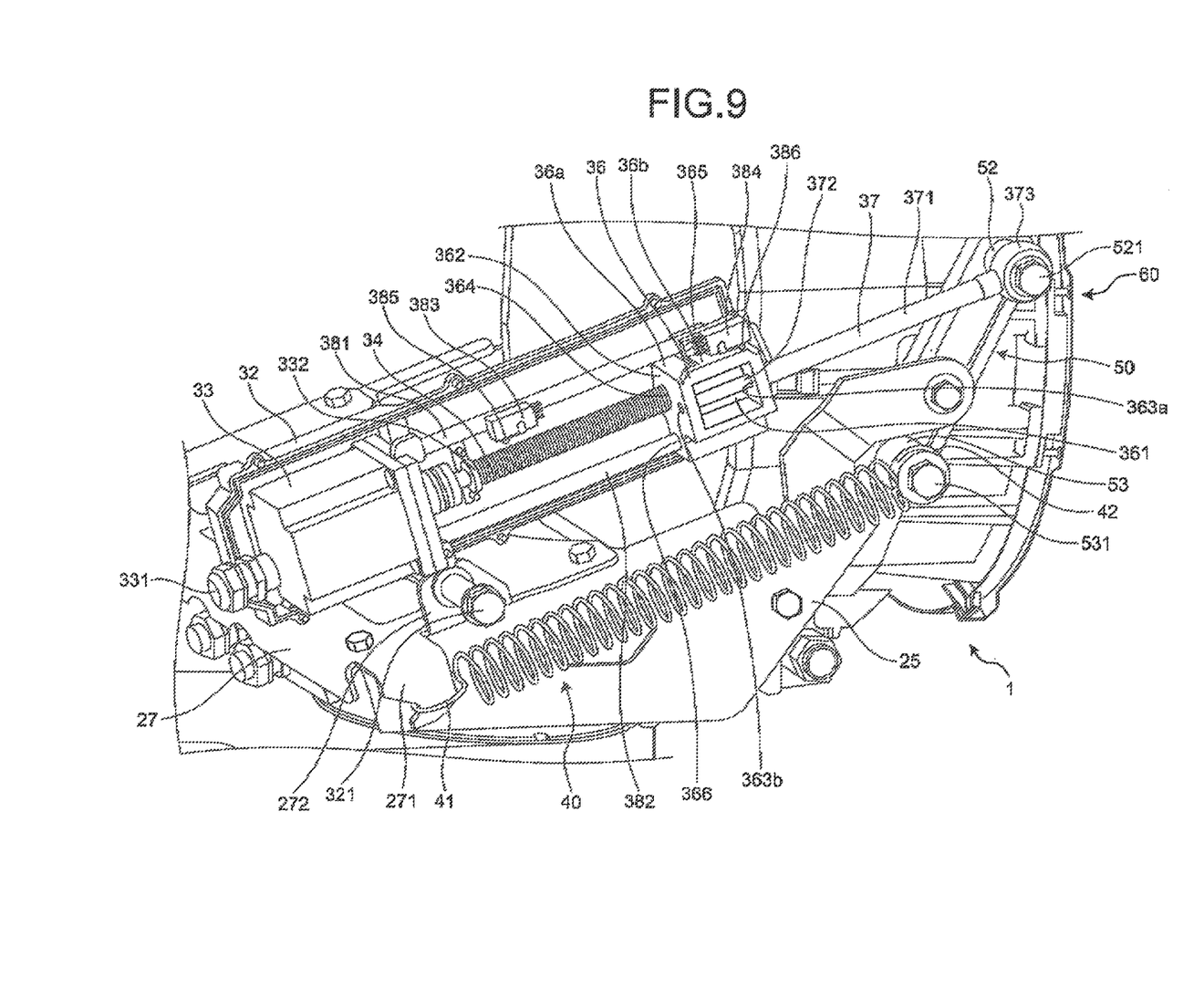
FIG. 9 is a perspective view illustrating main components of a lead screw unit according to the embodiment.
Figure 10:
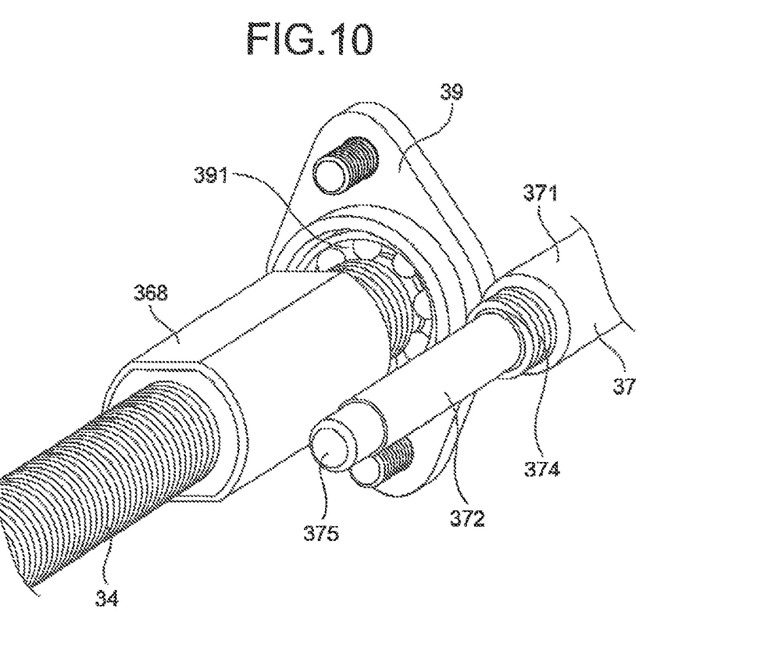
FIG. 10 is a perspective view illustrating main components inside a carriage according to the embodiment.

The structure inside the housing 31 is described with reference to FIGS. 9 and 10. FIG. 9 is a perspective view illustrating main components of the lead screw according to the embodiment. Specifically, FIG. 9 is a perspective view illustrating main components of the lead screw unit 30 without illustration of the housing 31. FIG. 10 is a perspective view illustrating main components inside a carriage according to the embodiment.

In the example illustrated in FIG. 9, a motor 33 is disposed at an end of the housing 31 opposite to the end from which the shaft 37 projects in the longitudinal direction. The motor 33 is configured by, for example, a stepper motor, and functions as a drive power source for rotating the lighting member 60 in second directions that differ from the first directions. Drive signals for driving the motor 33 may be provided in a wired or wireless manner. When, for example, the drive signals are provided to the motor 33 in a wired manner, the drive signals are provided to the motor 33 via a lead wire (not illustrated). The motor 33 may be connected with a lead wire introduced from an insert hole 331. In this case, the drive signals may be provided to the motor 33 from, for example, a controller installed in the storage box 28 described above via the lead wire.

A lead screw 34 is attached to the motor 33 and is rotated by the motor 33. The lead screw 34 extends in the longitudinal direction to the end from which the shaft 37 projects. A bearing 332 is interposed between the rotation shaft of the motor 33 and the lead screw 34. A carriage 36 is mounted to the lead screw 34.

The carriage 36 has an open portion 361 into which the shaft 37 is inserted, and a hollow portion 362 having a hollow space inside. To the open portion 361, a second rod 372 of the shaft 37 is inserted through an insert hole 363*a*. The second rod 372 is continuously connected to a first rod 371 of the shaft 37 and has a smaller diameter than that of the first rod 371. The shaft 37 is attached to the carriage 36 such that a threaded portion 374 provided between the first rod 371 and the second rod 372 is screwed into the insert hole 363*a*. A leading end 375 of the second rod 372 of the shaft 37 is supported by a catch hole 363*b* formed on a surface of the carriage 36 away from the insert hole 363*a*.

The shaft 37 has a mounting portion 373 at an end thereof opposite to the leading end 375. The mounting portion 373 is mounted to an end (a protrusion 52) of the link 50. Further details will be described later.

A nut 368 illustrated in FIG. 10 is disposed in the hollow portion 362. For example, the nut 368 is disposed in the hollow portion 362. The nut 368 has a planar circumferential surface that, for example, abuts a sidewall of the hollow portion 362, and thus, the rotation of the nut 368 is restricted. The lead screw 34 is inserted into the hollow portion 362 through an insert hole 364 of the carriage 36, and is screwed into the nut 368 in the hollow portion 362. In other words, the nut 368 can move on the lead screw 34 in accordance with the rotation of the lead screw 34. Thus, the nut 368 and the lead screw 34 configure a feed screw mechanism. When the nut 368 moves, which is located inside the hollow portion 362 of the carriage 36, an end portion of the nut 368 headed in the moving direction pushes the inner wall of the hollow portion 362 in the moving direction of the nut 368. Accordingly, the carriage 36 moves in the axial direction of the lead screw 34 together with the nut 368. With this configuration, the carriage 36 moves back and forth along the axis of the lead screw 34 by the drive of the motor 33.

Guide bars 381 and 382 are provided along the axis of the lead screw 34. The guide bar 381 is inserted into a recessed portion 365 of the carriage 36 and movably supports the carriage 36 from a first side of the carriage 36. The guide bar 382 is inserted into an insert hole 366 of the carriage 36 and movably supports the carriage 36 from a second side of the carriage 36 away from the guide bar 381. The carriage 36 has a first surface 36*a* and a second surface 36*b* at the first side (upper side in FIG. 9). The second surface 36*b* is located at a higher position than the first surface 36*a*. The carriage 36 may be supported by any structure other than the guide bars 381 and 382 as long as the carriage 36 is movably supported by the structure.

The guide bar 381 is provided with a pair of mechanical switches 383 and 384 at a certain interval in the longitudinal direction. In the example illustrated in FIG. 9, the mechanical switch 383 has a switch portion 385 extending toward the lead screw 34, and the mechanical switch 384 has a switch portion 386 extending toward the lead screw 34.

The switch portion 385 of the mechanical switch 383 and the switch portion 386 of the mechanical switch 384 are pushed by the second surface 36*b* of the carriage 36 in the distal directions from the lead screw 34 as the carriage 36 moves and the second surface 36*b* approaches the switch portions. The mechanical switch 383 or the mechanical switch 384 is turned on when the carriage 36 reaches a certain position. For example, when the mechanical switch 383 is turned on, the mechanical switch 383 transmits an electric signal to a certain mechanism such as a controller, and the rotation of the motor 33 is stopped.

In other words, the carriage 36 is movable between a position at which the mechanical switch 383 is turned on and a position at which the mechanical switch 384 is turned on. With this configuration, the mechanical switches 383 and 384 function as a detection mechanism that limits the range of movement of the carriage 36 to a certain range. Other devices such as sensors may be used instead of the mechanical switches 383 and 384 as long as the range of movement of the carriage 36 can be limited to a certain range.

A fixing lug 39 including a bearing 391 is provided to a leading end of the lead screw 34 away from the motor 33. The bearing 391 pivotally supports both thrust load and radial load of the lead screw 34. Thus, the drive apparatus 1 can receive both thrust load of the lead screw 34 and radial load of the lead screw 34. The bearing 391 provided in the fixing lug 39 receives such loads on the lead screw 34, and the lead screw 34 is easily rotated. This configuration can reduce the losses in the rotation of the lead screw 34.

Figure 11:
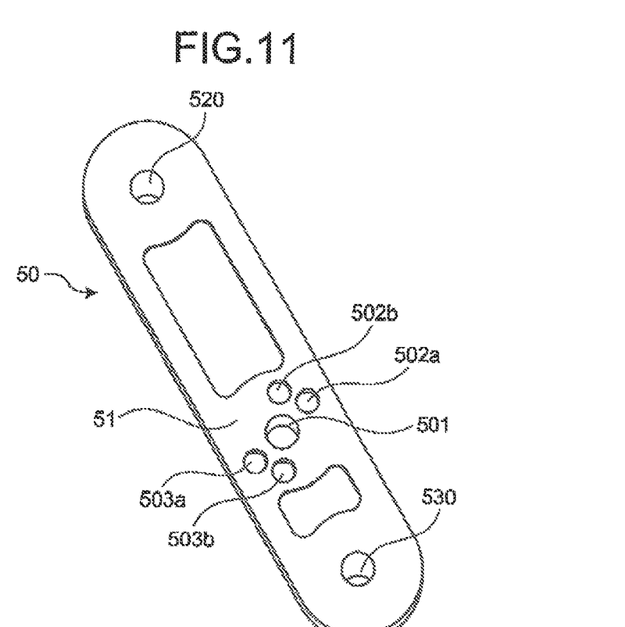
FIG. 11 is a perspective view illustrating a link according to the embodiment.

The link 50 is pivotally supported by the base 20. The link 50 is a second rotation unit that rotates in the second directions (directions in a plane along the XZ plane in the present embodiment) that differ from the first directions in accordance with the back-and-forth movement of the shaft 37. FIG. 11 is a perspective view illustrating the link according to the embodiment. In the following description, a surface of the link 50 that appears in FIG. 8 is referred to as a first surface, and a surface of the link 50 that appears in FIG. 11 and is opposite to the first surface is referred to as a second surface.

The link 50 has a long support portion 51 and protrusions 52 and 53 disposed at both ends of the support portion 51 in the longitudinal direction and protruding from the first surface. The protrusion 52 has a through hole 520 in its center portion through the thickness of the support portion 51. The protrusion 53 has a through hole 530 in its center portion through the thickness of the support portion 51. The support portion 51 has a through hole 501 between the protrusions 52 and 53. In the example illustrated in FIG. 11, the through hole 501 is disposed in a position close to the protrusion 53 in the longitudinal direction of the support portion 51.

The link 50 is rotatably mounted to the end portion 251 of the arm 25 by a certain fastening member 511 and the through hole 501 of the support portion 51. The fastening member 511 may be, for example, a nut. The link 50 is rotatably mounted to the end portion 251 of the arm 25 such that, for example, the fastening member 511 is inserted into a through hole (not illustrated) of the end portion 251 of the arm 25 and into the through hole 501 of the support portion 51 from a side close to the arm 25. In this case, the link 50 rotates in the second directions about the through hole 501 of the support portion 51. A bearing may be interposed between the fastening member 511 and the end portion 251 of the arm 25.

The mounting portion 373 of the shaft 37 is mounted to the protrusion 52 of the link 50. The mounting portion 373 of the shaft 37 is mounted to the protrusion 52 of the link 50 by a certain fastening member 521 and the through hole 520 of the protrusion 52. The fastening member 521 may be, for example, a nut. The mounting portion 373 of the shaft 37 is mounted to the protrusion 52 of the link 50 such that, for example, the fastening member 521 is screwed into a through hole (not illustrated) of the mounting portion 373 of the shaft 37 and into the through hole 520 of the protrusion 52 from a side close to the shaft 37. With this structure, an end portion of the link 50 close to the protrusion 52 moves in the second directions about the through hole 501 of the support portion 51 in accordance with the back-and-forth movement of the shaft 37. In other words, the link 50 rotates in the second directions about the through hole 501 of the support portion 51 in accordance with the back-and-forth movement of the shaft 37. A bearing may be interposed between a fastening member 522 and the mounting portion 373 of the shaft 37.

A second end 42 of the elastic member 40 opposite to the first end 41 thereof is hooked to the protrusion 53 of the link 50. A certain fastening member 531 is inserted into the through hole 530 of the protrusion 53 of the link 50, thereby preventing the second end 42 of the elastic member 40 from being disengaged from the protrusion 53. A bearing may be interposed between the fastening member 531 and the protrusion 53 of the link 50.

As described above, the first end 41 of the elastic member 40 is hooked to the bent portion 271 of the fixing member 27, and the elastic member 40 biases the protrusion 53 of the link 50 toward the fixing member 27. In other words, the link 50 is biased in a direction of the second directions by the elastic member 40. In the example illustrated in FIG. 8, the link 50 is biased clockwise about the through hole 501 of the support portion 51 by the elastic member 40. The elastic member 40 can prevent the lighting member 60 from rattling when the lighting member 60 is under wind pressure, for example. Although, in the present embodiment, the elastic member 40 is disposed below the lead screw unit 30 (−Z-axis direction), the elastic member 40 may be disposed, for example, above the lead screw unit 30 (+Z-axis direction). This configuration can achieve the same effect.

Figure 12:
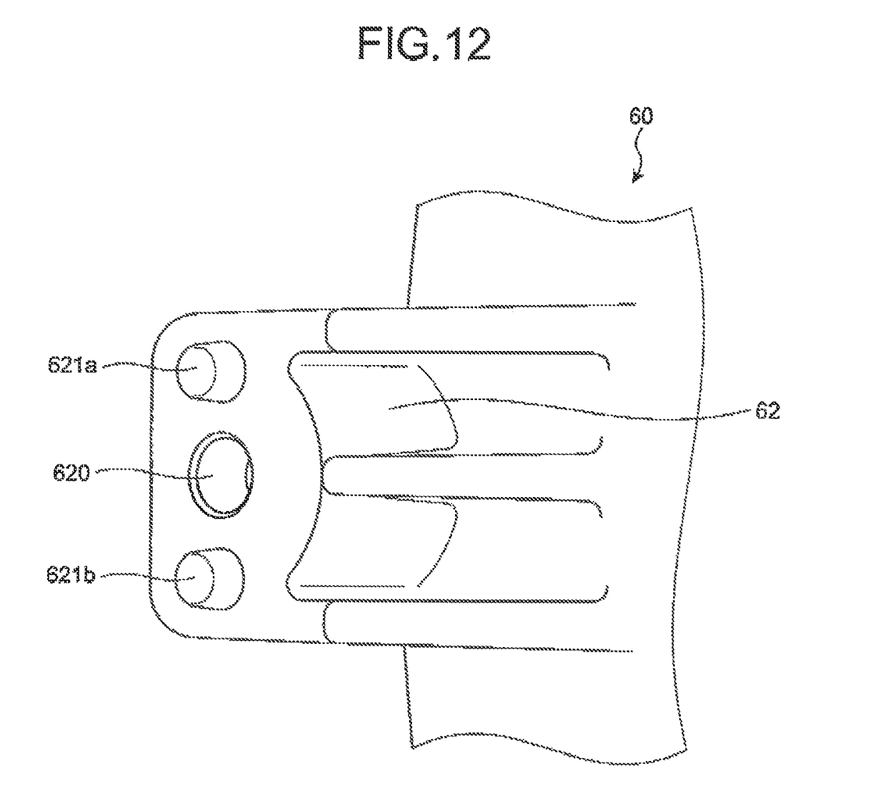
FIG. 12 is a perspective view illustrating a main component of a protruding portion of a lighting member according to the embodiment.

Described next is installation of the lighting member 60 to the link 50. The lighting member 60 according to the present embodiment includes seven light sources 61, but the lighting member 60 may include any number of light sources 61. The light sources 61 may be any type of light sources such as light emitting diodes (LEDs) for the intended use and applications. The lighting member 60 has protruding portions 62 and 63 on both sides thereof. FIG. 12 is a perspective view illustrating a main component of a protruding portion of the lighting member according to the embodiment.

The protruding portion 62 has an insert hole 620 in a center portion thereof. The fastening member 511 is inserted into the insert hole 620 of the protruding portion 62. The fastening member 511 is inserted into the through hole (not illustrated) of the end portion 251 of the arm 25, the through hole 501 of the support portion 51, and the insert hole 620 of the protruding portion 62 from the side close to the arm 25. The protruding portion 62 has a pair of protrusions 621a and 621b protruding therefrom. In the protruding portion 62, the protrusions 621a and 621b are disposed opposite to each other across the insert hole 620.

The support portion 51 of the link 50 has a pair of recesses 502a and 503a and a pair of recesses 502b and 503b on the back surface thereof. The pair of recesses 502a and 503a are disposed opposite to each other across the through hole 501 on the back surface of the support portion 51. The pair of recesses 502b and 503b are disposed opposite to each other across the through hole 501 on the back surface of the support portion 51.

For example, the pair of protrusions 621a and 621b are fitted into the pair of recesses 502a and 503a, or into the pair of recesses 502b and 503b with the fastening member 511 being inserted into the insert hole 620 of the protruding portion 62. As described above, the pair of protrusions 621a and 621b of the protruding portion 62 are fitted into the pair of recesses 502a and 503a or the pair of recesses 502b and 503b, and thus, the lighting member 60 is rotated in the second directions in accordance with the rotation of the link 50.

The inclination of the lighting member 60 relative to the link 50 can be changed by changing the pair of recesses into which the pair of protrusions 621a and 621b of the protruding portion 62 are fitted between the pair of recesses 502a and 503a or the pair of recesses 502b and 503b. The number of pairs of recesses included in the link 50 is not limited to two. The link 50 may include any number of pairs of recesses, such as three or five pairs of recesses.

The other protruding portion 63 has the same configuration as the protruding portion 62. A fastening member is inserted into a through hole (not illustrated) of the end portion 261 of the arm 26 and into an insert hole (not illustrated) of the protruding portion 63 from a side close to the arm 26. A support member may be interposed between the end portion 261 of the arm 26 and the protruding portion 63. For example, a pair of protrusions (not illustrated) of the protruding portion 63 are fitted into a pair of recesses formed on the support member, and the protruding portion 63 is rotatably mounted to the end portion 261 of the arm 26. With this configuration, the lighting member 60 rotates in the second directions about the center axis extending through the through hole 501 of the support portion 51 in the Y-axis direction in FIG. 8 (the direction into the drawing in FIG. 8). In other words, the lighting member 60 rotates in the vertical directions (tilt directions) with the link 50. For example, the lighting member 60 rotates in the vertical directions (tilt directions) by 90 degrees with the link 50.

As described above, the drive apparatus 1 can change the orientation of the lighting member 60 in the first directions by rotating the base 20 in the first directions in accordance with the rotation of the spur gear 100. For example, the drive apparatus 1 can change an orientation of the lighting member 60 in the horizontal directions by rotating the spur gear 100 in the first directions in the horizontal plane that is the rotational plane. The drive apparatus 1 causes the lighting member 60 to rotate in the second directions that differ from the first directions in accordance with the rotation of the link 50 rotated by the back-and-forth movement of the shaft 37. The rotational plane of the first directions crosses the rotational plane of the second directions. For example, the rotational plane of the first directions crosses the rotational plane of the second directions at right angles. The drive apparatus 1 can change the orientation of the lighting member 60 in the horizontal directions by rotating the spur gear 100 and can change the orientation of the lighting member 60 in the vertical directions in accordance with the rotation of the link 50 rotated by the back-and-forth movement of the shaft 37. With this configuration, the drive apparatus 1 can direct the lighting member 60 in a desired direction within a range of rotation in the first directions and a range of rotation in the second directions.

As described above, according to the embodiment, a supported member can be supported rotatably in two types of rotational directions with a simple configuration using, for example, the spur gear 100.

The embodiment described above is not intended to limit the scope of the present invention. Configurations made by combining the constituent elements above as appropriate are included in the scope of the present invention. Additional advantages and modifications will readily occur to those skilled in the art. Therefore, the invention in its broader aspects is not limited to the embodiment above, and various modifications can be made without departing from the spirit of the invention. In the example described above, the drive apparatus 1 is placed on a certain resting surface, but the drive apparatus 1 may be used in any other form as long as the drive apparatus 1 is installable. For example, the drive apparatus 1 may be installed on a ceiling or a wall instead of being placed on a resting surface.

According to an aspect of the present invention, a supported member can be supported rotatably in two types of rotational directions with a simple configuration.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A drive apparatus comprising:
a first rotation unit that includes a gear rotated in first directions by a first drive power source;
a base that is joined to the gear and rotates in the first directions with the gear;
a lead screw unit that is provided to the base and moves a shaft back and forth in a certain direction; and
a second rotation unit that is pivotally supported by the base, rotates in second directions that differ from the first directions in accordance with back-and-forth movement of the shaft, and supports a supported member rotatably in the second directions,
wherein the second rotation unit is rotated by a second drive power source that is different from the first drive power source, and
wherein a first rotation axis along which the first rotation unit rotates in the first directions and a second rotation axis along with the second rotation unit rotates in the second directions intersect each other or form skew lines.

2. The drive apparatus according to claim 1, further comprising a spring member that biases the gear that is restricted from rotating in a direction of the first directions in another direction of the first directions.

3. The drive apparatus according to claim 1, wherein the first rotation unit includes a bearing that supports the gear in an axial direction of the gear.

4. The drive apparatus according to claim 1, further comprising:
a detection mechanism configured to detect an angle of rotation of the gear and limit a range of the rotation of the gear to a first rotation angle; and
a limiting mechanism that is provided to the gear and limits the range of the rotation of the gear to a second rotation angle by contact with another member, the second rotation angle being larger than the first rotation angle.

5. The drive apparatus according to claim 1, wherein the gear is joined to the base through a plurality of joining mechanisms provided on a part of planar peripheral portion of the gear such that an orientation of the base is changeable in the first directions.

6. The drive apparatus according to claim 1, wherein a rotational plane of the first directions crosses a rotational plane of the second directions.

7. The drive apparatus according to claim 1, wherein the supported member is a lighting member including a light source.

* * * * *